June 13, 1967 W. J. WOSTL 3,324,711.
EVALUATION OF ENGINE AND FUEL PERFORMANCE
Filed Dec. 6, 1963
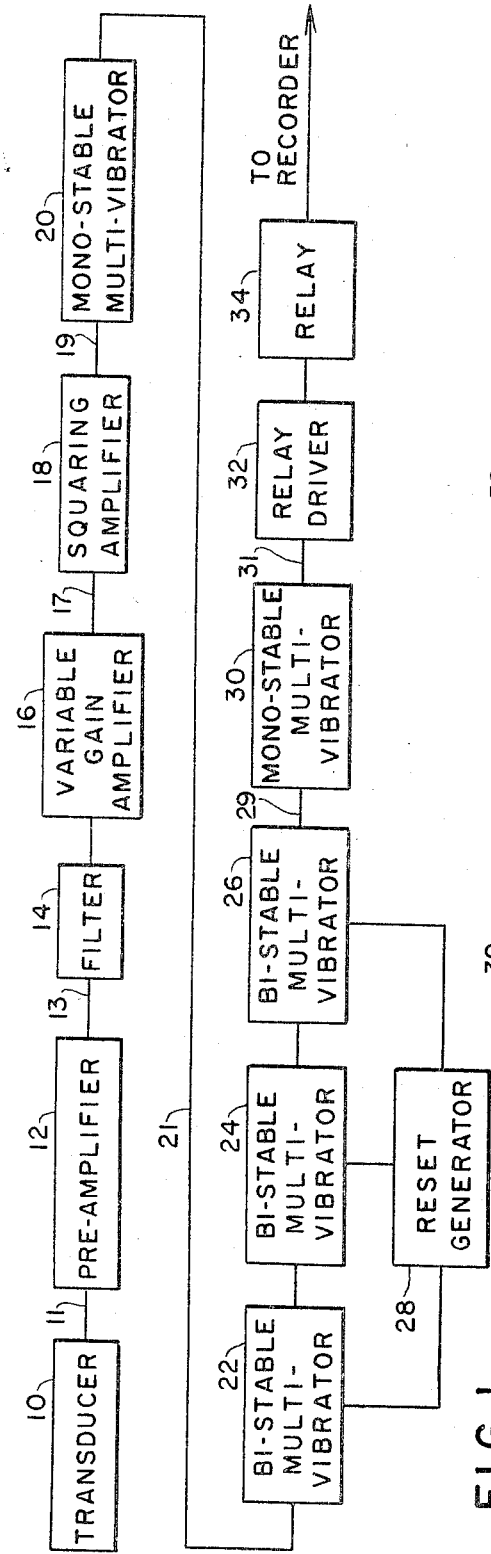
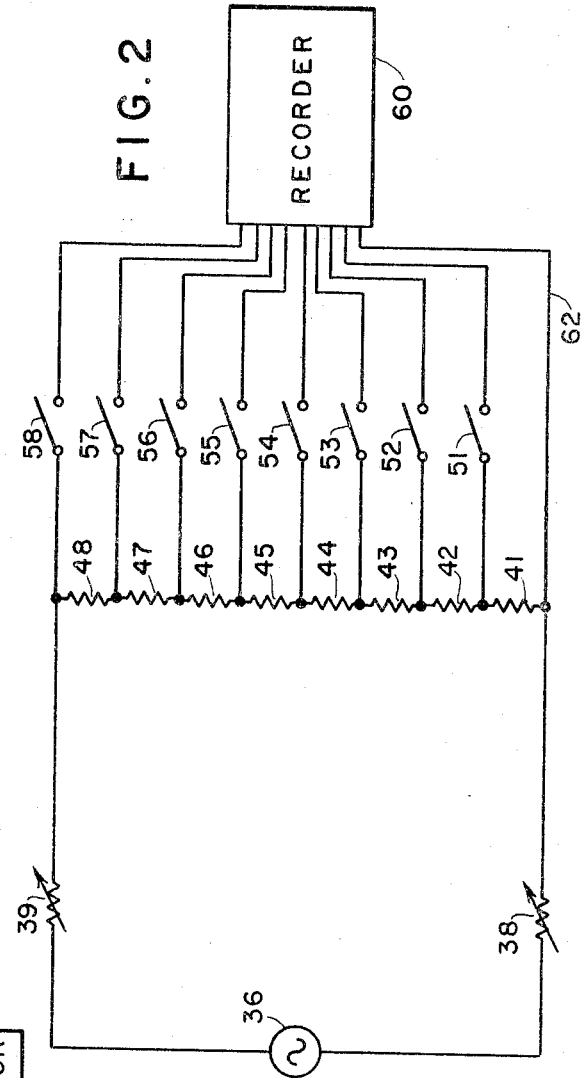
INVENTOR:
WOLFGANG J. WOSTL
BY
McLean and Boustead
ATTORNEYS

United States Patent Office 3,324,711
Patented June 13, 1967

---

3,324,711
EVALUATION OF ENGINE AND FUEL
PERFORMANCE
Wolfgang J. Wostl, South Holland, Ill., assignor to Sinclair Research, Inc., New York, N.Y., a corporation of Delaware
Filed Dec. 6, 1963, Ser. No. 328,651
5 Claims. (Cl. 73—35)

My invention pertains to internal combustion engines. More specifically, it provides a method for evaluating the performance of spark-ignition internal combustion engines and fuels intended for use therein.

The efficiency of a piston type internal combustion engine can theoretically be improved indefinitely by increasing the compression ratio or the intake pressure. As a practical matter, however, a point is reached at which the severity of these conditions causes knocking; the rapid deterioration of the engine caused by knocking makes it imperative that the engine be operated under less severe conditions. It is, therefore, desirable to operate such an engine at conditions close to but below the point at which knocking occurs, and it is an object of this invention to provide a method for determining those conditions.

On a multi-cylinder engine having a constant compression ratio throughout and fuel injection by means of a common manifold, the conditions under which each cylinder starts to knock will vary due to non-uniformities in the fuel distribution. Thus, in order to operate the engine with maximum efficiency while avoiding knock, it is necessary to keep non-uniformities in fuel distribution to a minimum, and it is a further object of this invention to provide a method for detecting knock in individual cylinders of a multi-cylinder engine as an aid to the study of fuel distribution.

The normal method for detecting cylinder knock utilizes a plurality of transducers, an amplifier and an oscilloscope. By this method pressure waves within the cylinder are converted to electrical signals which are amplified and presented graphically on the oscilloscope. An operator watching the oscilloscope observes numerous pressure-time diagrams each relating to a different cylinder and marks a graph or closes a switch when abnormal signals are observed from any cylinder. The difficulty of obtaining accurate results from this system is obvious, and a still further object of this invention is to provide a system for detecting knock in individual cylinders on a multi-cylinder internal combustion engine which completely eliminates the need for an oscilloscope or human observation.

While I consider my invention particularly suited to the study of mal-distribution in multi-cylinder engines I also anticipate using it to detect knock or rumble as an aid to the determination of the octane requirement of an engine or in a simplified form for knock determination on a single cylinder engine.

The method of my invention contemplates operating the engine under normal conditions and generating signals external to the engine which correspond in frequency and amplitude to noises originating within the engine. These signals are continuously generated as the severity of the engine operating conditions is increased until knocking begins to occur. From the generated signals, the portion relating to sounds caused by knocks is separated from that portion relating to sounds caused by normal combustion. The signals relating to knocks are then accumulated until signals relating to a predetermined number of distinct knocks have been detected. These accumulated signals are then converted to a single output signal which is recorded on a graph containing a continuous plot of engine operating conditions as the point in time when the "presence of knock" is detected in each cylinder.

"Presence of knock" is defined here as a predetermined number, greater than 1, of distinct knock pulses of a predetermined amplitude. This prevents a single wild and non-reproducible abnormal combustion from being recorded and therefore insures that the "presence of knock" recorded corresponds in time to the time when knocking actually began. I have chosen four knock pulses as indicative of the "present of knock" in my own work. This, however, is strictly an arbitrary figure and could be changed within a reasonable range without changing the essential nature of my system.

The signal utilized in the method of my invention may be electrical, acoustical or mechanical. A particularly convenient method of generating such a signal and, therefore, the one which I prefer to use is by incorporating a transducer into a spark plug. Such a modified spark plug is presently commercially available. This method is especially advantageous since an electrical signal can be generated without modification of the combustion chamber to accommodate a pressure indicator. Another suitable apparatus for generating such a signal is disclosed in my co-pending application Ser. No. 124,043, filed July 14, 1961 now Patent No. 3,247,705. Use of that apparatus, however, requires that the head of each cylinder be tapped. Alternately, a combination of signals may be used. For example, an acoustical signal may be generated and converted to an electrical signal at some distant point in the network.

Separation of signals relating to sounds caused by knock from those relating to normal combustion is described in my co-pending application Ser. No. 124,043 which discloses such separation based on the discovery that normal combustion sounds all have a frequency range below 4 kc. while the frequency of knock sounds almost invariably has a component within the range of 6 to 7 kc. By isolating the frequency range of 6 to 7 kc. a signal corresponding solely to knock can be obtained. Such a frequency separation may be accomplished whether the signal is electrical, acoustical or mechanical. If an electrical signal is used a filter circuit of the type well known in the art and commonly termed a "band pass filter" or a combination of low pass and high pass filters can be used. If acoustical or mechanical signals are used similar filtering can be accomplished by damping signals outside the desired frequency range. For example acoustical signals can be damped by a mechanical baffling to isolate the desired frequency range.

After the signals in the desired range have been filtered they are fed into an accumulation system from which an output signal is derived only upon the accumulation of a predetermined number of input signals. As stated above this accumulation system assures that the presence of knock will be recorded only when a cylinder is actually knocking repeatedly. A single knock may be a result of a combination of factors outside the scope of the conditions being studied and to record such a wild and unreproducible knock as indicative of the presence of knock would distort the results obtained from the study. The number of knocks that should be accumulated before an output signal is generated depends on the rate at which the severity of the engine operating conditions is increased. For example, if the inlet pressure is being increased slowly a larger number of knocks should be accumulated than in a test during which the intake pressure is increased sharply. As stated above, I have chosen four knocks as a fairly average number to be accumulated in determining the presence of knock. This anticipates the possibility that as many as three wild knocks may occur during the conduct of the test prior to reaching the critical condition at which knock becomes continuous, and yet allows for the recording of the "presence of knock" at the engine conditions at which knock begins and before those conditions are changed. In working with an electrical signal I have devised such an accumulator by feeding signals corresponding to abnormal combustions into a series of bi-stable multi-vibrators. Each such multi-vibrator requires an input signal of proper polarity to change its mode of operation. Once changed it will continue in that second mode of operation until another similar input pulse is applied to return it to its original mode of operation. By arranging these bi-stable multi-vibrators in series they operate as "frequency halvers" since it requires two pulses to the first to actuate the second. By changing the number of multi-vibrators any desired number of input pulses can be required in order to produce a single output signal.

The signal corresponding to the "presence of knock" in each cylinder is recorded by utilizing it to close a switch in a voltage divider network. Closure of the switch results in the recording of a mark indicative of the "presence of knock" on an oscillograph on which the intake manifold air pressure is simultaneously recorded. Other methods of recording are of course anticipated and can be used in the method of the present invention without changing its essential nature.

For a more complete understanding of my invention reference is made to the attached drawings of which:

FIGURE 1 is a block diagram of the circuit used to generate a signal indicative of the "presence of knock" in a single cylinder of a spark-ignition internal combustion engine; and FIGURE 2 is a line diagram of the voltage divider network used to identify and transmit to a recorder signals generated by a plurality of networks similar to that depicted in FIGURE 1.

Referring more particularly to FIGURE 1 a transducer 10 is employed in association with the cylinder to convert pressure waves occurring within the cylinder into electrical signals of corresponding amplitude and frequency. This electrical signal is fed to a preamplifier 12 as indicated by line 11. Preamplifier 12 serves to amplify the weak signal coming from transducer 10 and at the same time match the high impedance of the piezo-electric transducer to the next stage in the system.

The amplified signal from preamplifier 12 is fed into a filter 14 as indicated by line 13. Filter 14 is so designed to pass only that portion of the signal coming from preamplifier 12 in the range of 6 kc. to 7 kc. As previously noted this may be accomplished in a single "band pass filter" or by the combination of a high pass filter and a low pass filter, the latter being preferred due to the greater accuracy obtainable therein.

The output from filter 14 is fed to a variable gain amplifier 16, which determines the minimum amplitude pulse that will be passed to the remainder of the network. From the variable gain amplifier 16 the signal is fed, as indicated by line 17, to a squaring amplifier 18 which shapes the pulses for passage by line 19 to a mono-stable multi-vibrator 20. Mono-stable multi-vibrator 20, resets itself faster than shortest engine cycle time contemplated and slower than the longest knock pulse encountered, for example, at a speed of 0.01 sec. Multi-vibrator 20 thus not only determines the duration of pulses fed to the accumulation portion of the network but insures that only one pulse is passed corresponding to a single knock. Such a construction is required since the signal corresponding to a single knock may include two distinct portions or peaks of sufficient amplitude to pass the variable gain amplifier and be delivered as separate pulses by the squaring amplifier. Mono-stable multi-vibrator 20 prevents these pulses from being each given the same effect as pulses corresponding to individual knocks.

The output from mono-stable multi-vibrator 20 is fed to the accumulation portion of the network as indicated by line 21. The accumulation portion of the network consists of three bi-stable multi-vibrators 22, 24 and 26, and a reset generator 28. Multi-vibrators 22 and 24 are connected to form a two-stage binary counter while multi-vibrator 26 is connected to the output of such counter to be operated thereby to change its mode in one way only, while requiring an extraneous reset signal to change its mode in the reverse manner. Thus, each distinct signal of proper polarity fed to bi-stable multi-vibrator 22 changes its mode of operation. However, only every other signal fed to bi-stable multi-vibrator 22 is transmitted to bi-stable multi-vibrator 24 with the proper polarity to change its mode of operation. Similarly every other signal fed to bi-stable multi-vibrator 24 is transmitted with the proper polarity to trigger the reset multi-vibrator 26 which generates a single output signal. Thus, it can be seen that four individual signals must be fed to bi-stable multi-vibrator 22 before an output signal is generated. Once the reset multi-vibrator 26 has generated a single output signal no further output signals will be passed regardless of the number of signals fed to bi-stable multi-vibrator 22 until the reset multi-vibrator 26 is activated by a reset signal. Such a signal is provided by an independently operable pulse generator such as reset generator 28, which is connected to provide a common reset signal not only to reset multi-vibrator 26 but also to each of multi-vibrators 22 and 24 such that after reset a total of four input pulses is required to trigger multi-vibrator 26 no matter what modes multi-vibrators 22 and 24 were in before reset.

The output signal passed by reset multi-vibrator 26 is fed to a mono-stable multi-vibrator 30 as indicated by line 29. Mono-stable multi-vibrator 30 determines the duration of the output signal indicative of the "presence of knock" so that a sufficient signal is fed to the recording portion of the network to cause a recognizable mark to be recorded. This signal from mono-stable multi-vibrator 30 is fed to a relay driver 32, as indicated by line 31, and thereby actuates a relay 34.

Referring now more particularly to FIGURE 2 the voltage divider network used to identify the signals corresponding to each of the cylinders of a multi-cylinder engine is shown in more detail. As illustrated the network is part of a circuit including a power source 36, zeroing resistors 38 and 39 one on each side of power source 36 and eight resistors 41–48 respectively connected in series between zeroing resistors 38 and 39.

A recorder 60 having eight input leads and a common ground or return is connected to the circuit. The input leads are connected through switches 51–58 to points in the circuit between adjacent ones of resistors 41 through 48 and 39, respectively. The common ground or return is connected to the circuit between resistors 41 and 38 as shown by line 62. By alternately closing switches 51 through 58 the recorder can be connected to the power source in such a way that it receives eight different signals of varying potential. Each switch 51–58 constitutes a part of relay 34 in the circuit of FIGURE 1. One such circuit is associated with each of the different cylinders and actuation of each relay 34 closes its corresponding switch 51–58 thereby sending an identified signal to the recorder.

As will be noted the above network provides for only a single signal as indicative of the "presence of knock" in each cylinder. That is, once a single signal has passed the reset multi-vibrator no further signals will be generated until the reset generator is activated. This arrangement is particularly useful in a maldistribution study where the severity of the engine conditions is continuously increased until all cylinders are knocking. Under such circumstances it can be seen that once a cylinder has started to knock it will continue knocking as the severity of the engine conditions is increased. Thus, once the "presence of knock" is noted in a cylinder it can be assumed that such knocking continues throughout the remainder of the test.

If it were desired to utilize my invention under conditions requiring continued indication of the presence of knock the above network could be easily rearranged to affect such purpose. These and other modifications of my invention will be immediately obvious to workers acquainted with the type of network here involved. Further, while I have described my invention with reference to an electrical circuitry which I have found particularly advantageous since it involves no modification of the engines tested; as I noted above, similar networks can be arranged using acoustical or mechanical signals.

I claim:

1. The method of evaluating the performance of a multi-cylinder spark-ignition internal combustion engine and fuel therefor by operating said engine at conditions of inlet and discharge pressure, compression ratio and fuel-air ratio such that only normal combustion will occur in said cylinders, generating separate signals external of the engine corresponding in amplitude and frequency to sounds originating within the respective cylinders of said engine, increasing the severity of operation of said engine until abnormal combustion occurs in a plurality of said cylinders, separating from the generated signals that portion corresponding to abnormal combustion, separately accumulating a predetermined plurality of signals corresponding to distinct abnormal combustions for each of said plurality of cylinders for which signals are generated, and recording the point in time when said predetermined plurality of signals corresponding to distinct abnormal combustion are accumulated whereby the distribution of said signals in said cylinders with respect to time is obtained.

2. The method of claim 1 wherein the signals generated are electrical signals.

3. The method of claim 1 wherein separation of signals corresponding to abnormal combustion is affected by separating the portion of the generated signal within the frequency range of 6 to 7 kc.

4. The method according to claim 1 wherein the predetermined number of signals corresponding to distinct abnormal combustions is four.

5. The method of claim 1 wherein only signals corresponding to distinct abnormal combustions having an amplitude at least equal to a predetermined minimum amplitude are accumulated.

References Cited

UNITED STATES PATENTS

| 2,496,338 | 2/1950 | Barton | 73—35 |
| 2,534,276 | 12/1950 | Lancor | 73—35 |
| 2,560,734 | 7/1951 | Mouzon. | |
| 2,607,215 | 8/1952 | De Boisblanc | 73—116 X |
| 2,622,441 | 12/1952 | Richardson et al. | 73—35 X |
| 2,941,396 | 12/1960 | Adams | 73—35 |
| 3,201,972 | 8/1965 | Krause | 73—35 |

FOREIGN PATENTS 866,261  2/1953  Germany.

RICHARD C. QUEISSER, *Primary Examiner.*

J. J. GILL, *Assistant Examiner.*